United States Patent
Kim et al.

(10) Patent No.: US 7,894,394 B2
(45) Date of Patent: Feb. 22, 2011

(54) RESOURCE ALLOCATION METHOD AND APPARATUS IN MULTI-CHANNEL SYSTEM

(75) Inventors: Nam-Gi Kim, Suwon-si (KR); Jung-Je Son, Seongnam-si (KR); Min-Hee Cho, Suwon-si (KR); Jae-Hyuk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 772 days.

(21) Appl. No.: 11/928,838

(22) Filed: Oct. 30, 2007

(65) Prior Publication Data

US 2008/0101287 A1 May 1, 2008

(30) Foreign Application Priority Data

Oct. 30, 2006 (KR) .................. 10-2006-0105580

(51) Int. Cl.
*H04W 4/00* (2009.01)
(52) U.S. Cl. ...................................... 370/329
(58) Field of Classification Search .............. None
See application file for complete search history.

(56) References Cited

U.S. PATENT DOCUMENTS

| | | | | |
|---|---|---|---|---|
| 7,729,310 B2* | 6/2010 | Kim | ................ | 370/330 |
| 2005/0157639 A1* | 7/2005 | Song et al. | ................ | 370/208 |
| 2005/0195909 A1 | 9/2005 | Hwang et al. | | |
| 2005/0201309 A1* | 9/2005 | Kang et al. | ................ | 370/310 |
| 2006/0146856 A1* | 7/2006 | Jung et al. | ................ | 370/431 |
| 2006/0268983 A1* | 11/2006 | Kwon et al. | ................ | 375/240.11 |
| 2007/0002958 A1* | 1/2007 | Chang et al. | ................ | 375/260 |
| 2007/0263735 A1* | 11/2007 | Tong et al. | ................ | 375/260 |

FOREIGN PATENT DOCUMENTS

| | | |
|---|---|---|
| KR | 2005-0089699 | 9/2005 |
| KR | 1020050091591 | 9/2005 |
| KR | 1020060115293 | 11/2006 |

* cited by examiner

*Primary Examiner*—Anh-Vu Ly
(74) *Attorney, Agent, or Firm*—The Farrell Law Firm, P.C.

(57) ABSTRACT

Radio resource allocation apparatus and method in a multi-channel system are provided. The method includes determining a type of a channel to be allocated to terminals, which request a resource allocation. When there is a terminal to be assigned the band AMC channel, necessary resources are allocated to the terminal as resources of the band AMC channel within a frequency band preferred by the terminal. A virtual resource space is generated which collects resources not allocated as the resources of the band AMC channel. Resources are allocated to terminals to be assigned the diversity channel from within the virtual resource space. Accordingly, the radio resources can be efficiently allocated in the multi-channel system where the diversity channel and the band AMC channel coexist.

21 Claims, 9 Drawing Sheets

RESOURCE ALLOCATION METHOD AND APPARATUS IN MULTI-CHANNEL SYSTEM

PRIORITY

This application claims priority under 35 U.S.C. §119(a) to an application filed in the Korean Intellectual Property Office on Oct. 30, 2006 and assigned Serial No. 2006-105580, the disclosure of which is incorporated herein by reference.

BACKGROUND OF THE INVENTION

1. Field of the Invention

The present invention relates generally to a resource allocation method and apparatus in a multi-channel system, and more particularly, to an efficient resource allocation method and apparatus in a multi-channel system in which a diversity channel and a band Adaptive Modulation and Coding (AMC) channel coexist.

2. Description of the Related Art

A fourth generation (4G) communication system requires a technique for providing various Quality of Service (QoS) to users at a data rate of about 100 Mbps. Similar to a Local Area Network (LAN) system and a Metropolitan Area Network (MAN) system, the 4G communication system requires a high speed service that guarantees mobility and QoS. For example, Institute of Electrical and Electronics Engineers (IEEE) 802.16e standard defines standards for supporting the high-speed service with the guaranteed mobility and QoS required by the 4G communication system.

The communication system according to the IEEE 802.16e standard can split the diversity channel and the band AMC channel into time unit zones. Using the diversity channel, the communication system can acquire the total frequency distribution gain using the channels distributed over the frequency band. Hence, a scheduler of a terminal does not seriously consider the position of the resource allocated from a Base Station (BS).

Using the band AMC channel, the communication system communicates by exclusively using channels of the frequency band having a good channel condition. Accordingly, using the band AMC channel, the scheduler of the terminal requests the BS to allocate the frequency band by taking into account the channel characteristic of the frequency band.

In the wireless MAN system, an information collection delay time for the channel is closely related to a system throughput. When the frame is long, it takes a considerable amount of time for the BS to collect channel information of terminals traveling in a given service coverage. In this case, the channel may severely change while the BS utilizes actual channel information for sending channel information and data provided from the terminals. Therefore, the long frame may depreciate the prediction of the channel condition and degrade the system throughput.

By contrast, when the frame is short, the BS gathers channel information of terminals in the service coverage over a short term. A more accurate channel prediction is possible due to a smaller channel change while the BS utilizes actual channel information for sending channel information and data provided from the terminals. Therefore, system development is required to reduce the frame length in order to efficiently send data.

Figure 1:
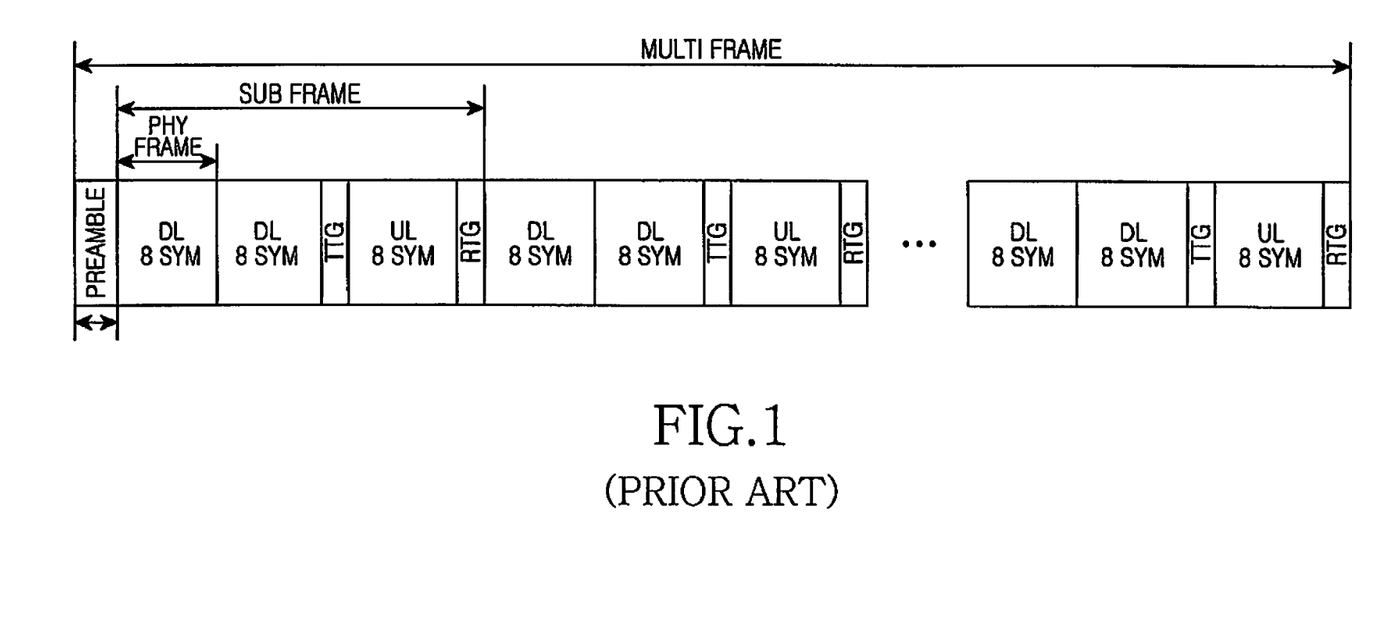
FIG. 1 illustrates a conventional frame structure of a wireless MAN system.

FIG. 1 illustrates a conventional frame structure of a wireless MAN system.

The wireless MAN system can make the length of a physical (PHY) frame by 1 ms as shown in FIG. 1.

As discussed above, when the frame length is shortened in the communication system, it is possible to reduce the information collection time for the channels. However, when the frame length is short, the time of the frame is also shortened in the communication system. As a result, the frame length is too short to divide the diversity channel and the band AMC channel into the time-unit zones in the communication system.

SUMMARY OF THE INVENTION

The present invention has been made to address at least the above problems and/or disadvantages, and to provide at least the advantages described below. Accordingly, an aspect of the present invention is to provide an apparatus and method for allocating resources so that a diversity channel and a band AMC channel can coexist by the frequency unit without dividing zones in a frame in a system having a short frame length.

Another aspect of the present invention is to provide a resource allocation apparatus and method in a multi-channel system, which allocates a band AMC channel according to a 2-3 tree scheme and allocates resources of a diversity channel through a virtual resource space which collects the unallocated resources.

The above aspects are achieved by providing a radio resource allocation method of a Base Station (BS) in a multi-channel system where a diversity channel and a band Adaptive Modulation and Coding (AMC) channel coexist. A type of a channel is determined to be allocated to terminals that request a resource allocation. When there is a terminal to be assigned the band AMC channel, resources are allocated to the terminal as resources of the band AMC channel within a frequency band preferred by the terminal. A virtual resource space is generated that collects resources not allocated as the resources of the band AMC channel. Resources are allocated to terminals to be assigned the diversity channel within the virtual resource space.

According to one aspect of the present invention, a radio resource allocation method of a terminal in a multi-channel system is provided. Resource allocation information is received from a BS. A type of a channel allocated to the terminal is confirmed based on the resource allocation information. A virtual resource space is confirmed when the allocated channel is a diversity channel. The virtual resource space is a collection of resources not allocated to other terminals as resources of a band AMC channel. Resources of the diversity channel assigned from the BS through the virtual resource space are confirmed.

According to another aspect of the present invention, a BS in a multi-channel system includes a scheduler for allocating necessary resources within a frequency band preferred by a terminal, which prefers a band AMC channel. The scheduler is also for allocating resources to the terminal to allocate resources of a diversity channel using a virtual resource space, which collects resources not allocated as the resources of the band AMC channel. Further, the scheduler is for generating resource allocation information. The BS also includes a resource allocator for allocating resources to the terminals according to the generated resource allocation information.

According to a further aspect of the present invention, a terminal in a multi-channel system includes a receiver for receiving resource allocation information from a BS. The terminal also includes an allocated resource confirmer for, when a channel allocated to the terminal is a diversity channel according to the resource allocation information, confirming resources of the diversity channel allocated to the terminal through a virtual resource space which collects resources not allocated to other terminals as resources of a band AMC channel. The terminal further includes a subchannel demapper for using the corresponding resource under the control of the allocated resource confirmer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following detailed description, well-known processes or constructions are not described in detail to avoid obscuring the subject matter of the present invention.

The present invention provides a technique for efficiently allocating users to a diversity channel and a band AMC channel in a multi-channel system where the diversity channel and the band AMC channel coexist.

Figure 2:
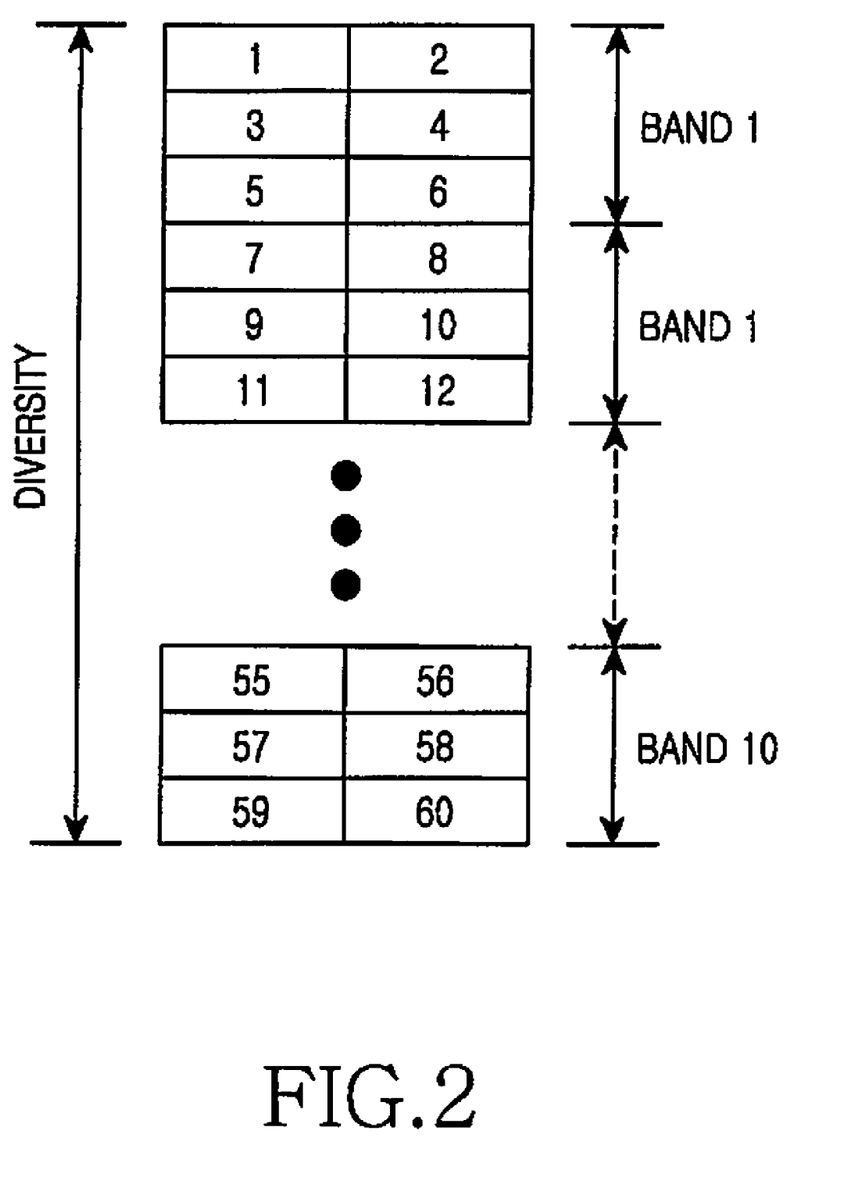
FIG. 2 illustrates a logical subchannel structure where a diversity channel and a band AMC channel, having different characteristics, coexist based on a frequency axis according to an embodiment of the present invention.

FIG. 2 illustrates a logical subchannel structure where a diversity channel and a band AMC channel, with different characteristics from each other, coexist based on a frequency axis according to an embodiment of the present invention. Hereafter, in accordance with an embodiment of the present invention, it is assumed that the number of logical subchannels is 60.

A communication system can utilize subchannels 1-60 as the diversity channel as shown in FIG. 2. Also, the communication system can utilize subchannels 1-60 as the band AMC channel. The communication system may divide subchannels 1-60 into the diversity channel and the band AMC channel. That is, the communication system may mix and allocate the diversity channel and the band AMC channel in the same time axis using a virtual resource space. To use the subchannels as the band AMC channel, subchannels 1-60 are divided into 10 bands. It is assumed that slots in the same band have the same frequency characteristic. Accordingly, terminals using the band AMC channel are allocated the resources by the band.

When the subchannels are divided between the diversity channel and the band AMC channel in the communication system, the terminals allocated to the band AMC channel may cause fragmentation of the diversity channel resources. In other words, since the terminals assigned to the band AMC channel have a different frequency characteristic according to the allocated band position, the position of the allocated resource is limited. When there are terminals allocated to the band AMC channel, the resource fragmentation occurs because the resources excluding the bands allotted to the terminals are allotted to the terminals that use the diversity channel.

To address the resource fragmentation, the terminal using the diversity channel confirms the resources allocated to the other terminals that use the band AMC channel and then generates a virtual resource space with those resources not allocated to the other terminals. Next, the terminal can be assigned a resource of the diversity channel through the virtual resource space.

When the terminal using the diversity channel cannot confirm the resource allocation information of the other terminals using the band AMC channel, the terminal is able to confirm the virtual resource space by receiving a bit map which discriminates the used resources and the available resources, from a BS. Next, the terminal can be assigned a resource of the diversity channel through the virtual resource space.

To allocate the resources of the diversity channel using the virtual resource space, the BS can allocate the virtual space resource to the terminal that uses the diversity channel using a position-length allocation method or a binary tree method. The position-length allocation method informs of the start point and the length of the resource allocated to the terminal in the virtual resource space. The binary tree method informs of the resource bound by the multiple of 2 and allocated to the terminal.

The band AMC channel is subject to the limitation of resource performance according to physical position. Hence, the terminals using the band AMC channel need to represent which band the allocated resource belongs to.

To allocate the resources to the terminals using the binary tree method in the communication system, the binary tree method allocates the resources by a multiple of 2. However, when the band units are bound up by a multiple of 6, rather than by the unit of 2^N, as shown in FIG. 2, the conventional binary tree method cannot allocate the resources. Therefore, the present invention allocates the resources using a 2-3 tree scheme as shown in FIG. 3.

Figure 3:
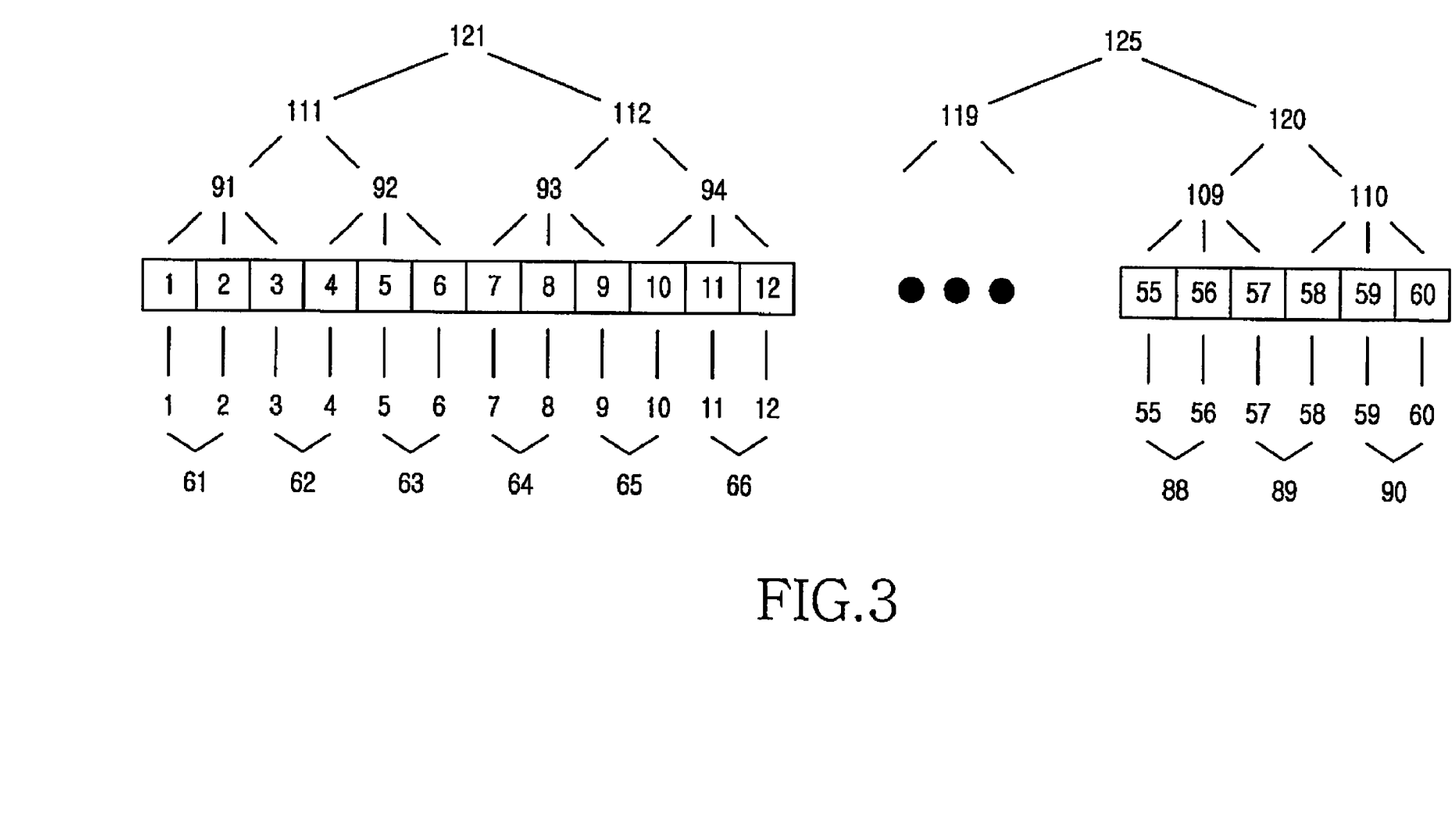
FIG. 3 illustrates a resource allocation method according to a 2-3 tree scheme according to an embodiment of the present invention.

FIG. 3 illustrates a resource allocation method according to the 2-3 tree scheme according to an embodiment of the present invention.

The 2-3 tree scheme of FIG. 3 may constitute a tree with two radio resource bundles having a multiple of 3. If there are 60 resources as shown in FIG. 2, the 2-3 tree scheme maps index numbers to resources bound by 2 units, 3 units, 6 units, and 12 units. The BS can allocate the resources using the index numbers and the terminals can confirm their allocated resources using the index numbers. Since there are 125 cases in resource allocation, the 2-3 tree scheme is able to allot the resources with a 7-bit (2^7) radio resource.

For example, when resources 7, 8 and 9 are allocated to a specific terminal using the 2-3 tree scheme, the BS broadcasts an indicator of the terminal allocated the resources and index 93 indicative of resources 7, 8 and 9. The BS allocates the resources to the terminal by sending index 93 to the terminal assigned the resources.

Figure 4:
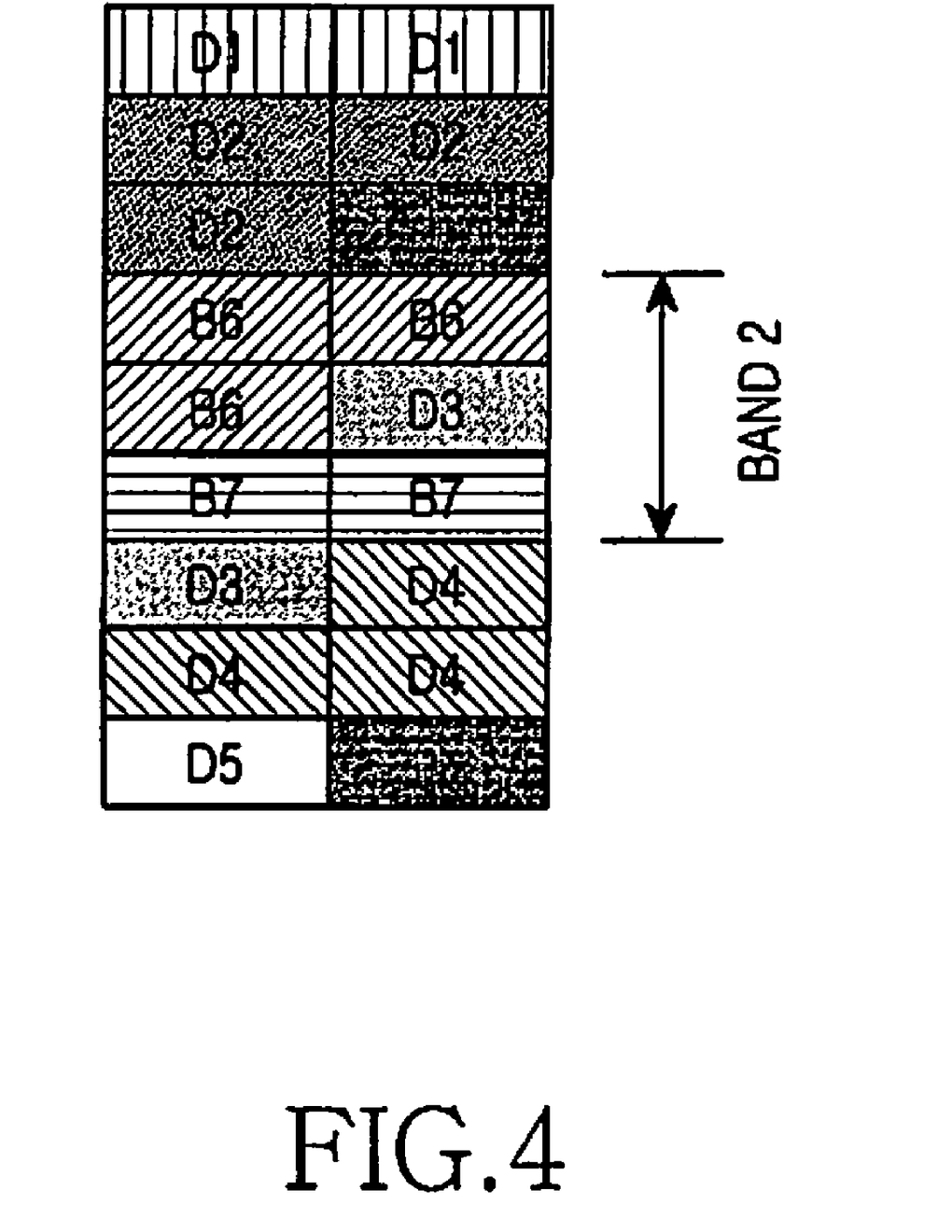
FIG. 4 illustrates resource allocation when a band AMC channel and a diversity channel coexist in one frame according to an embodiment of the present invention.

FIG. 4 illustrates resource allocation when a band AMC channel and a diversity channel coexist in one frame according to an embodiment of the present invention. In FIG. 4, D indicates the diversity channel and B indicates the band AMC channel. The suffixes of D and B correspond to a terminal number.

Within one frame, the diversity channels and the band AMC channel can be allotted to the terminals as shown in FIG. 4. Specifically, terminals 1, 2, 3, 4 and 5 are assigned the diversity channel, and terminals 6 and 7 are assigned the band AMC channel.

The resources are allotted to terminals 1, 2, 3, 4 and 5 using the virtual resource space generated with the resources not allocated to terminals 6 and 7. As a result, the split resources are allocated to terminal 3.

Figure 5:
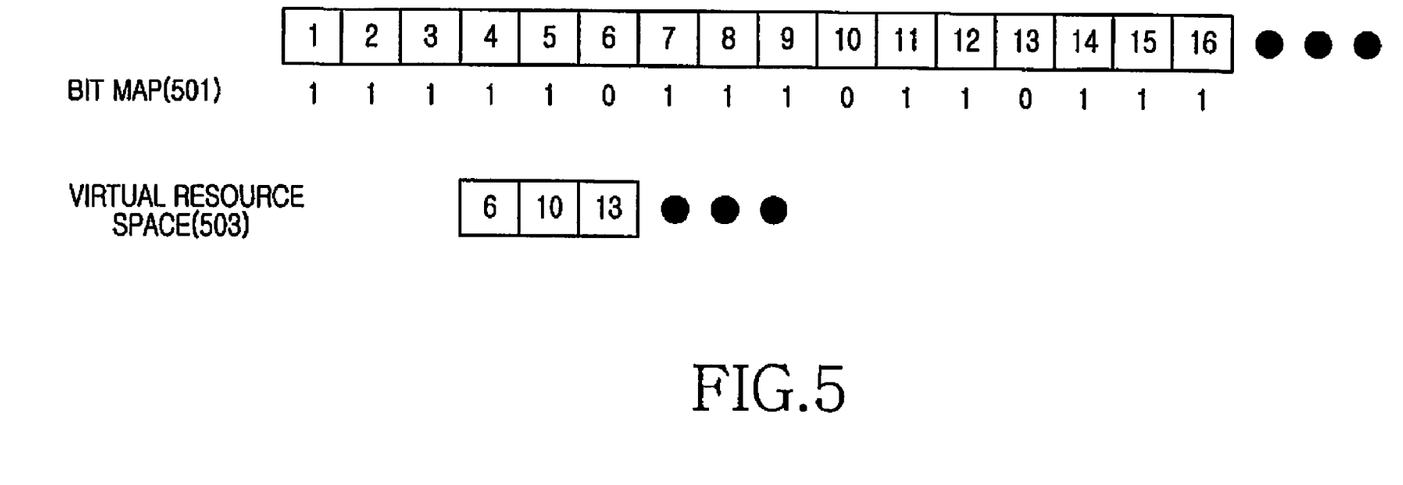
FIG. 5 illustrates a resource allocation method in a multi-channel system according to an embodiment of the present invention.

FIG. 5 illustrates a resource allocation method in a multichannel system according to an embodiment of the present invention.

In FIG. 5, the BS allocates the resources of the band AMC channels to terminals traveling in service coverage. The BS constitutes a bit map 501 indicative of the channels allocated as the band AMC channel. For example, when resources 1-16, excluding the resources 6, 10, and 13, are allocated as the band AMC channel, the BS constitutes the bit map 501 of 1111101110110111. '1' indicates that the corresponding resource is allocated as the band AMC channel and '0' indicates that the resource is not allocated as the band AMC channel. Using the bit map 501, the BS may generate a virtual resource space 503. Also, the BS may send the bit map 501 to the terminals so that the terminals may generate the virtual resource space 503.

The virtual resource space 503 collects the resources not allocated as the band AMC channel, in order to allocate the resources of the diversity channel. For example, the BS generates the virtual resource space 503 by virtually collecting the resources 6, 10 and 13. The BS allocates the resources of the diversity channel to the terminals through the virtual resource space 503.

As indicated above, when the resources for the diversity channel are allocated using the virtual resource space 503, the split resource 10 and 13 for the terminal 3 in FIG. 4 can be allocated. The resource allocation method in the virtual resource space 503 can adopt the position-length scheme and the binary tree scheme.

To allocate the resources of the virtual resource space using the position-length method, the BS constitutes position and length information (2, 2) of the resource to be allotted to the terminal in the virtual resource space 503 and sends the position and length information to the terminal. The terminal confirms the same virtual resource space 503 as the BS. Next, the terminal can learn from the position and length information (2, 2) received from the BS that the resources 10 and 13 with the start point 2 and the length 2 in the virtual resource space 503 are assigned to the terminal.

To allocate the resources of the virtual resource space using the binary tree method, the BS sends the index (2, 3) marked at the bottom of FIG. 3 to the terminal to allocate resources 2 and 3 to the terminal. The terminal confirms the same virtual resource space 503 as the BS. The terminal can learn from the index (2, 3) received from the BS that the second and third resources 10 and 13 in the virtual resource space 503 are assigned to the terminal.

How the terminal confirms the virtual resource space 503 can be divided into situations in which the BS sends the bit map 501 and in which the BS does not send the bit map 501.

When the BS sends the bit map 501, the terminal can generate the virtual resource space 503 using the bit map 501 received from the BS. More specifically, when the terminal cannot acquire information relating to the resources allotted to the other terminals or when the BS does not send the resource allocation information in every frame, the terminal can generate the virtual resource space 503 using the bit map 501 received from the BS.

When the BS does not send the bit map 501, every terminal can confirm the resources allotted to the other terminals through MAP broadcast from the BS. Hence, the terminal can generate the virtual resource space 503 using the resource allocation information acquired from the MAP broadcast from the BS. Herein, the resources allotted to the other terminals denote the resources allotted as the band AMC channel. Thus, the terminal can confirm the virtual resource space 503 by collecting the resources not allotted as the band AMC channels.

Figure 6:
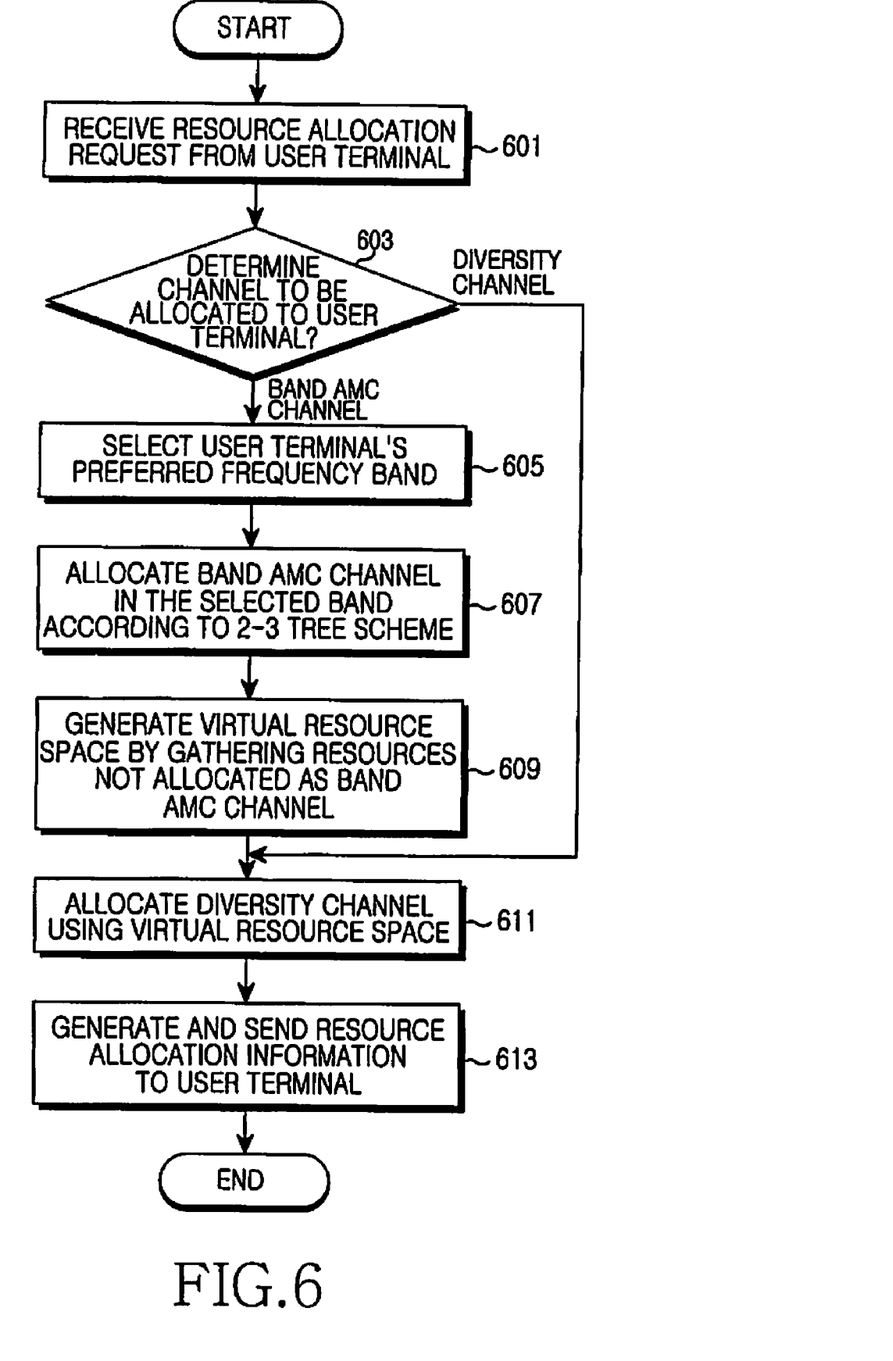
FIG. 6 is a flowchart of a radio resource allocation method of a Base Station (BS) in a wireless communication system according to an embodiment of the present invention.

FIG. 6 is a flowchart of a radio resource allocation method of the BS in a wireless communication system according to an embodiment of the present invention.

In step 601, the BS receives resource allocation requests from user terminals. In step 603, the BS determines a channel to be allocated to the user terminals that request the resource allocation. In doing so, the BS can determine whether to allocate the band AMC channel or the diversity channel to the user terminals based on channel quality information received from the user terminals.

Next, the BS classifies the terminals into terminals allocated to the band AMC channel and terminals allocated to the diversity channel. The BS proceeds to step 605 to allocate resources to the terminals for the band AMC channel, or the BS proceeds to step 611 to allocate resources to the terminals for the diversity channel. When there is at least one terminal to be allocated the band AMC channel, step 605 is performed before step 611 to generate the virtual resource space.

In step 605, the BS selects a frequency band preferred by the user terminal to be allotted the band AMC channel. The BS can select the terminal's preferred frequency band based on information contained in the channel quality information. In step 607, the BS allocates necessary resources in the selected band as the resources of the band AMC channel according to the 2-3 tree scheme.

The BS completes the resource allocation for the band AMC channel by repeating steps 605 and 607 with respect to every user terminal to be assigned resources of the band AMC channel. Next, the BS generates the virtual resource space by gathering the radio resources not allocated as band AMC channels in step 609.

In step 611, the BS allocates the resources of the diversity channel to the user terminals to be assigned the diversity channel, which are classified in step 603, using the virtual resource space generated in step 609. The BS allocates the resources of the diversity channel in the virtual resource space using the position-length scheme or the binary tree scheme.

In step 613, the BS generates resource allocation information MAP according to the allocations in steps 607 and 609 and broadcasts the resource allocation information to the user terminals. The resource allocation information can include an allocation bit, which indicates whether it is for the band AMC channel or the diversity channel. For example, the resource allocation bit '0' indicates the resource allocation information of the diversity channel, and the resource allocation bit '1' indicates the resource allocation information of the band AMC channel. The terminal, receiving the resource allocation information, can determine the type of the channel it is allocated based on the resource allocation bit.

Figure 7:
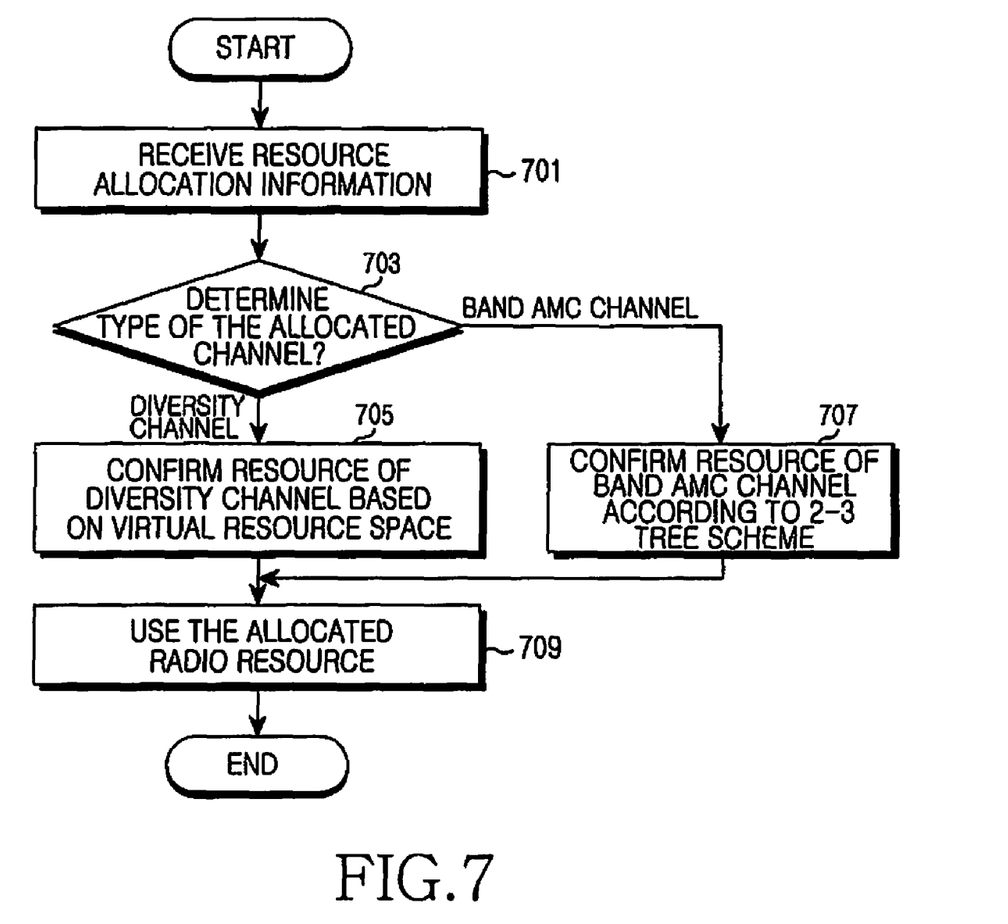
FIG. 7 is a flowchart of a radio resource allocation method of a terminal in the wireless communication system according to an embodiment of the present invention.

FIG. 7 is a flowchart of a radio resource allocation method of a terminal in the wireless communication system according to an embodiment of the present invention.

In step 701, the user terminal receives the resource allocation information MAP from the BS. In step 703, the user terminal determines whether the type of the channel it is allocated is the diversity channel or the band AMC channel based on the resource allocation information. The user terminal can determine the type of allocated channel based on the resource allocation bit contained in the resource allocation information. When the diversity channel is allocated, the process continues at step 705. When the band AMC channel is allocated, the process continues at step 707.

In step 705, the user terminal confirms resources allotted to the other terminals as the resources of the band AMC channel and generates a virtual resource space by gathering resources not allotted as the resources of the band AMC channel. Next, the user terminal confirms its assigned resources in the virtual resource space using the virtual resource space allocation information received from the BS.

Alternatively, the user terminal can confirm the virtual resource space by means of the bit map contained in the resource allocation information or periodically broadcast by the BS.

In step 707, the user terminal confirms its allocated resources of the band AMC channel according to the 2-3 tree scheme.

In step 709, the user terminal communicates with the BS using the its allocated resources confirmed in steps 705 and 707.

Figure 8:
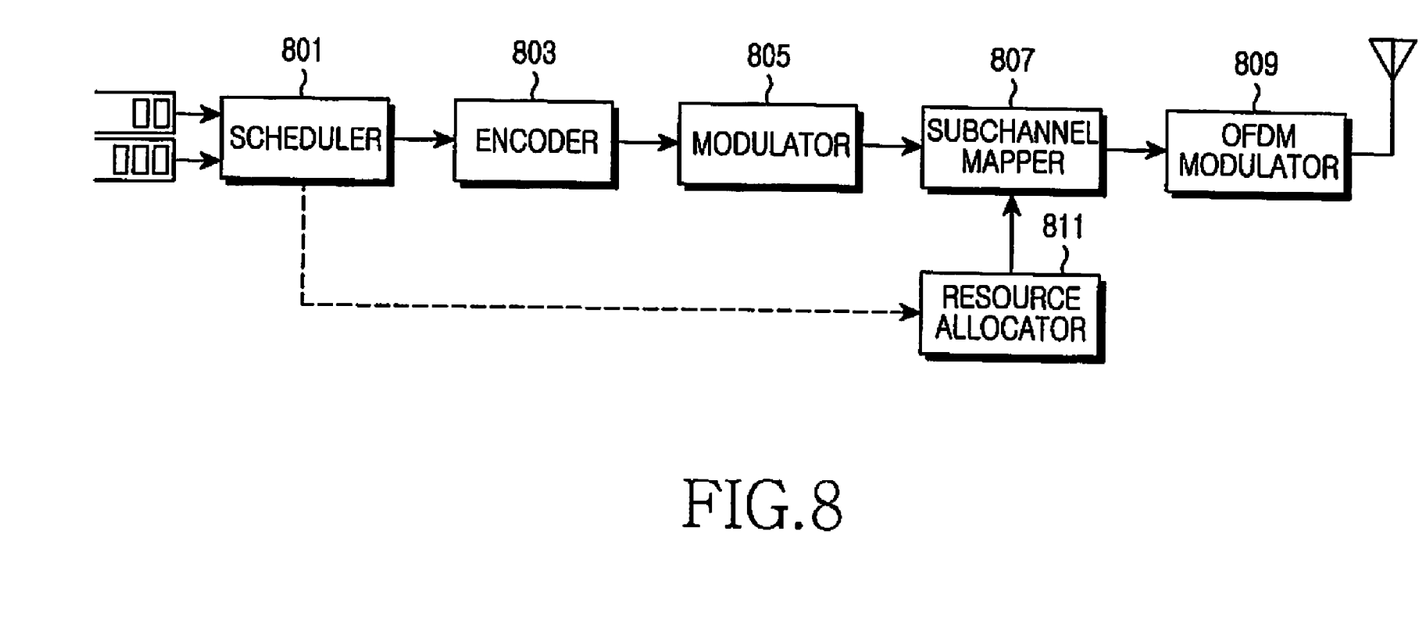
FIG. 8 is a block diagram of the BS which allocates the radio resources in the wireless communication system according to an embodiment of the present invention.

FIG. 8 is a block diagram of the BS, which allocates the radio resources in the wireless communication system, according to an embodiment of the present invention. The BS includes a scheduler 801, an encoder 803, a modulator 805, a subchannel mapper 807, an Orthogonal Frequency Division Multiplexing (OFDM) modulator 809, and a resource allocator 811.

The scheduler 801 receives data to be transmitted to the user terminals and schedules resource allocation of the user terminals. Next, the scheduler 801 outputs data to the encoder 803 for transmission to the user terminals, according to the scheduling information. The scheduler 801 outputs the resource allocation information, which is the scheduling information for the resource allocator 811. Particularly, the scheduler 801 allocates resources to the user terminals to be assigned the band AMC channel according to the type of the channel to be allocated to the user terminals. Next, the scheduler 801 generates the virtual resource space by collecting the resources not allocated as resources of the band AMC channel and allocates the resources of the diversity channel using the virtual resource space. In doing so, the scheduler 801 selects a frequency band preferred by the user terminal, which prefers the band AMC channel. Next, the scheduler 801 allocates the necessary resources to the user terminal within the selected band. The scheduler 801 generates the resource allocation information to allocate the resources of the diversity channel through the virtual resource space, which collects the resources not allocated as the resources of the band AMC channel for the user terminal to be assigned the resource of the diversity channel.

The encoder 803 encodes the user data fed from the scheduler 801 at a corresponding coding rate and outputs the encoded data. The encoder 803 can be implemented using a convolutional encoder, a turbo encoder, or a Low Density Parity Check (LDPC) encoder.

The modulator 805 outputs modulated data by mapping the encoded user data to signal points in a constellation according to the corresponding modulation scheme. Modulation schemes include, for example, a Binary Phase Shift Keying (BPSK), which maps one bit to one signal point (complex symbol), a Quadrature Phase Shift Keying (QPSK), which maps two bits to one complex symbol, an 8-ary Phase Shift Keying (8PSK), which maps three bits to one complex symbol, and a 16 Quadrature Amplitude Modulation (16QAM), which maps four bits to one complex symbol.

The subchannel mapper 807 maps the modulated user data fed from the modulator 805 to the respective subchannels according to subchannel mapping information provided from the resource allocator 811.

The OFDM modulator 809 converts the data from the subchannel mapper 807 to a time-domain signal through an Inverse Fast Fourier Transform (IFFT). Next, the OFDM modulator 809 converts the time-domain digital signal to an analog signal, RF-processes the analog signal to be transmitted, and sends the signal via a Tx antenna over the radio channel.

The resource allocator 811 confirms the subchannels to be mapped by the modulated user terminal data fed from the modulator 805 using the resource allocation information of the user terminal, which is the scheduling information provided from the scheduler 801. Next, the resource allocator 811 outputs the subchannel mapping information which is the information relating to the subchannels to be mapped by the modulated user terminal data, to the subchannel mapper 807.

Figure 9:
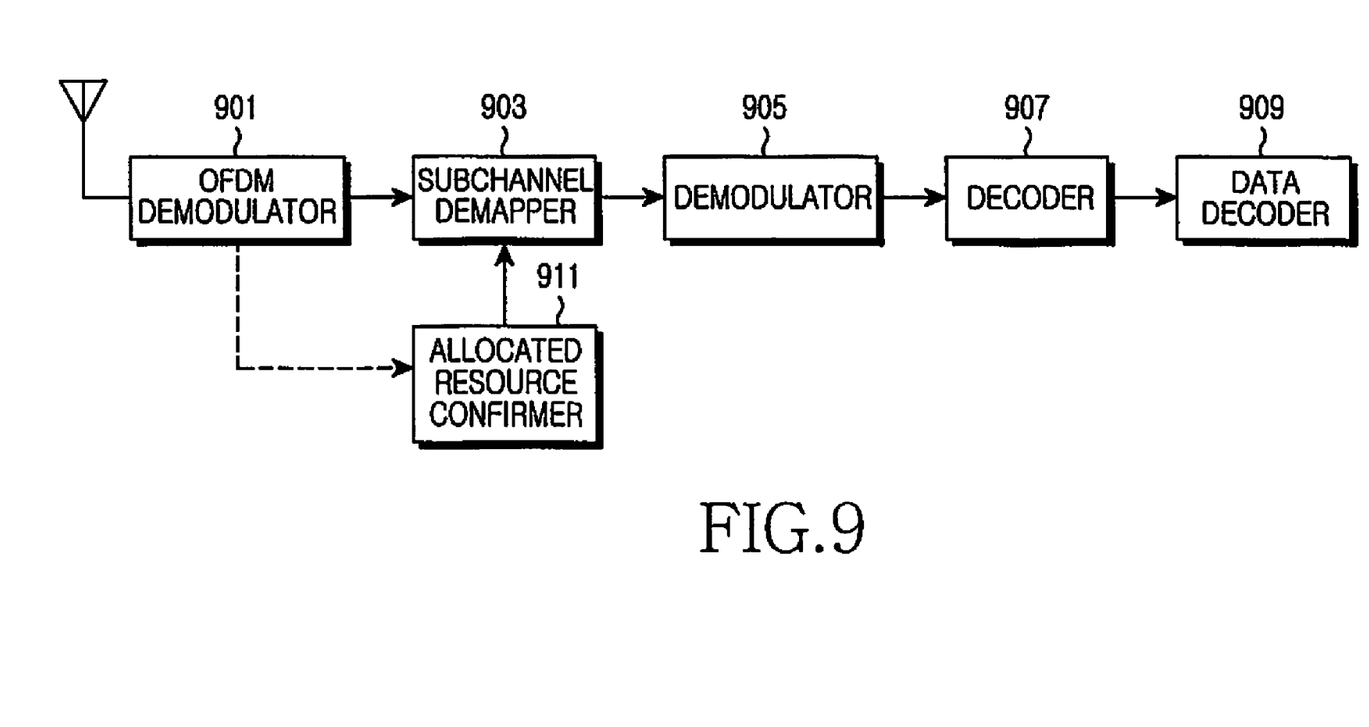
FIG. 9 is a block diagram of the terminal that is assigned the radio resources in the wireless communication system according to an embodiment of the present invention.

FIG. 9 is a block diagram of the terminal, which is allocated the radio resource in the wireless communication system, according to an embodiment of the present invention. The terminal includes an OFDM demodulator 901, a subchannel demapper 903, a demodulator 905, a decoder 907, a data decoder 909, and an allocated resource confirmer 911.

The OFDM demodulator 901 converts the RF signal received on an Rx antenna to a baseband signal and then to a digital signal. Next, the OFDM demodulator 901 converts the digital signal to frequency-domain data through a Fast Fourier Transform (FFT).

The subchannel demapper 903 selects a subchannel corresponding to the terminal from the multiple subchannels fed from the OFDM demodulator 903 and outputs the selected subchannel to the demodulator 905. The subchannel demapper 903 can select its allocated subchannel by receiving information of its allocated subchannel from the allocated resource confirmer 911.

The demodulator 905 demodulates the selected subchannel according to the corresponding modulation scheme and outputs the demodulated data. The decoder 907 restores the original data received from the BS by decoding the demodulated data fed from the demodulator 905 according to the coding scheme of the transmitter. The data decoder 909 converts the restored data to an analog signal.

The allocated resource confirmer 911 can confirm its allocated resource from the resource allocation information contained in the MAP received from the BS, which is provided from the OFDM demodulator 901. The resource allocation information contained in the MAP includes the resource allocation bit indicative of the type of the channel allocated to the terminal. The resource allocation information can include the bit map indicative of the virtual resource space.

The allocated resource confirmer 911 determines the type of its allocated channel based on the resource allocation bit contained in the resource allocation information. When the band AMC channel is allocated, the allocated resource confirmer 911 confirms the resources of its allocated band AMC channel from the resource allocation information. When the diversity channel is allocated, the allocated resource confirmer 911 confirms the resources of its allocated diversity channel through the virtual resource space, which collects the resources not allocated to the other terminals as the resources of the band AMC channel.

As set forth above, it is possible to efficiently allocate the radio resource in the multi-channel system where the diversity channel and the band AMC channel coexist.

In addition, it is possible to effectively mix and assign the users suitable for the diversity channel and the users suitable for the band AMC channel.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A radio resource allocation method of a Base Station (BS) in a multi-channel system where a diversity channel and a band Adaptive Modulation and Coding (AMC) channel coexist, the method comprising the steps of:
    determining, by the BS, a type of a channel to be allocated to terminals that request a resource allocation;
    allocating resources to at least one terminal as resources of the band AMC channel within a frequency band preferred by the at least one terminal, when the band AMC channel is assigned to the at least one terminal;
    generating a virtual resource space comprising resources that are not allocated as the resources of the band AMC channel; and
    allocating resources of the virtual resource space to one or more terminals assigned the diversity channel;
    wherein the virtual resource space is a collection of resources not allocated to the at least one terminal as the resources of the band AMC channel in a same time domain as a time domain that allocates the resources of the band AMC channel.

2. The radio resource allocation method of claim 1, wherein allocating resources to at least one terminal comprises:
    allocating the resources to the at least one terminal as the resources of the band AMC channel according to a 2-3 tree scheme which allocates resources by binding up radio resources in two bundles and in bundles in multiples of three.

3. The radio resource allocation method of claim 1, further comprising:
    generating resource allocation information relating to resources of the band AMC channel and resources of the diversity channel allocated to the terminals; and
    sending the resource allocation information to the terminals.

4. The radio resource allocation method of claim 3, wherein the resource allocation information comprises allocation bits which indicate the type of channels allocated to the terminals.

5. The radio resource allocation method of claim 3, wherein the resource allocation information comprises a virtual resource space comprising a bit map.

6. The radio resource allocation method of claim 3, wherein the resource allocation information comprises start point and length information of the resources of the virtual resource space allocated to the one or more terminals assigned the resources of the diversity channel.

7. The radio resource allocation method of claim 3, wherein the resource allocation information comprises a group index of resources of the virtual resource space allocated to one or more terminals assigned the resources of the diversity channel.

8. The radio resource allocation method of claim 1, further comprising:
    after allocating the resources to the at least one terminal as resources of the band AMC channel, defining a bit map with the resources allocated as the band AMC channel and resources not allocated as the band AMC channel; and
    sending the bit map information to the terminals.

9. A radio resource allocation method of a terminal in a multi-channel system, the method comprising:
    receiving, by the terminal, resource allocation information from a Base Station (BS);
    confirming a type of a channel allocated to the terminal based on the resource allocation information;
    when the allocated channel is a diversity channel, confirming a virtual resource space which is a collection of resources not allocated to other terminals as resources of a band Adaptive Modulation and Coding (AMC) channel; and
    confirming resources of the diversity channel assigned from the BS through the virtual resource space;
    wherein confirming the virtual resource space comprises:
    confirming resources of the band AMC channel allocated to other terminals based on the resource allocation information; and
    generating the virtual resource space by collecting resources excluding the resources of the band AMC channel allocated to the other terminals.

10. The radio resource allocation method of claim 9, wherein confirming the virtual resource space comprises:
    receiving resource allocation information of the band AMC channel allocated to other terminals from the BS, the resource allocation information comprising a bit map; and
    generating the virtual resource space by collecting resources excluding the resources of the band AMC channel allocated to the other terminals.

11. The radio resource allocation method of claim 9, wherein confirming resources of the diversity channel comprises:
    receiving resource allocation information of the virtual resource space from the BS; and
    confirming resources allocated to the terminal in the virtual resource space according to the resource allocation information of the virtual resource space.

12. The radio resource allocation method of claim 11, wherein the resource allocation information of the virtual resource space comprises a start point and a length of the resource to be allocated in the virtual resource space.

13. The radio resource allocation method of claim 11, wherein the resource allocation information of the virtual resource space comprises an index of resource groups to indicate the resources to be allocated in the virtual resource space.

14. The radio resource allocation method of claim 9, further comprising:
    when the allocated channel is the band AMC channel, confirming resources of the band AMC channel allocated to the terminal based on the resource allocation information.

15. A Base Station (BS) in a multi-channel system, the BS comprising:
- a scheduler for allocating necessary resources within a frequency band preferred by a terminal which prefers a band Adaptive Modulation and Coding (AMC) channel, allocating resources to the terminal to allocate resources of a diversity channel using a virtual resource space which collects resources not allocated as the resources of the band AMC channel, and generating resource allocation information; and
- a resource allocator for allocating resources to the terminals according to the generated resource allocation information;
- wherein the scheduler generates the virtual resource space by collecting resource not allocated as the resources of the band AMC channel in a same time domain as a time domain which allocates the resources of the band AMC channel.

16. The BS of claim 15, wherein the scheduler allocates the necessary resources as the resources of the band AMC channel according to a 2-3 tree scheme which allocates resources by binding up radio resources into two bundles and into bundles in multiples of three.

17. The BS of claim 15, wherein the scheduler generates resource allocation information for a terminal which prefers the diversity channel, the resource allocation information comprising start point and length information of the virtual resource space which allocates the diversity channel to the terminal.

18. The BS of claim 15, wherein the scheduler generates resource allocation information for a terminal which prefers the diversity channel, the resource allocation information comprising an index of resource groups of the virtual resource space which allocates the diversity channel to the terminal.

19. A terminal in a multi-channel system, the terminal comprising:
- a receiver for receiving resource allocation information from a Base Station (BS);
- an allocated resource confirmer for, when a channel allocated to the terminal is a diversity channel according to the resource allocation information, confirming resources of the diversity channel allocated to the terminal through a virtual resource space which collects resources not allocated to other terminals as resources of a band Adaptive Modulation and Coding (AMC) channel; and
- a subchannel demapper for using the corresponding resource under the control of the allocated resource confirmer;
- wherein the allocated resource confirmer generates the virtual resource space by collecting the resources excluding the resources of the band AMC channel allocated to the other terminals based on the resource allocation information.

20. The terminal of claim 19, wherein the allocated resource confirmer generates the virtual resource space by collecting the resources excluding the resources of the band AMC channel allocated to the other terminals, according to resource allocation information of the band AMC channel allocated to the other terminals, the resource allocation information comprising a bit map and received from the BS.

21. The terminal of claim 19, wherein, when the channel allocated to the terminal is the band AMC channel, the allocated resource confirmer confirms the resources of the band AMC channel allocated to the terminal.

* * * * *